Aug. 6, 1963 H. FORWALD 3,100,001
PNEUMATICALLY OPERATED AIR BLAST VALVE
Filed Nov. 14, 1961

INVENTOR.
HAAKON Forwald
BY
ATTORNEYS

United States Patent Office 3,100,001
Patented Aug. 6, 1963

3,100,001
PNEUMATICALLY OPERATED AIR
BLAST VALVE
Haakon Forwald, Ludvika, Sweden, assignor to Allmanna
Svenska Elektriska Aktiebolaget, Vasteras, Sweden, a
Swedish corporation
Filed Nov. 14, 1961, Ser. No. 152,274
Claims priority, application Sweden Nov. 15, 1960
2 Claims. (Cl. 137—596.1)

My invention relates to a valve which is useful as the operating valve of an air blast circuit breaker, and more specifically relates to a novel valve construction wherein the valve is maintained in one of its predetermined positions by a compressed air control source, wherein the compressed air must be maintained in a high pressure condition over extended periods of time.

Valves such as operating valves of an air blast circuit breaker must be held in a predetermined valve position for extended periods of time under the influence of compressed air from a source of controlled air pressure. Since the compressed air must be contained for an extended period of time, there have been considerable problems due to slow leakage of the compressed air to open air through the area between the cylinder and operating piston to which valve members are secured. For this reason, it has been the practice to utilize membrane-operated valves. Membrane-type valves are relatively large and expensive, since a membrane will permit only a small stroke and thereby requires that the contact surface of the valve-head be relatively large in comparison to the contact surface of an ordinary valve member to provide a sufficient open area through which fluid flow can occur when the valve is opened.

The principle of the present invention is to provide an auxiliary sealing member about the piston which encloses the space to which the compressed air is applied, whereby the compressed air will be sealed with respect to any openings through which piston rods and the like extend.

Accordingly, it is a primary object of this invention to provide a novel valve construction for high pressure-operated valves which are kept under operating pressure over extended periods of time.

Another object of this invention is to utilize an auxiliary seal for pressure-operated valves which are kept under operating pressure for extended periods of time.

These and other objects of my invention will become apparent from the following description when taken in connection with the drawings, in which.

Figure 1:
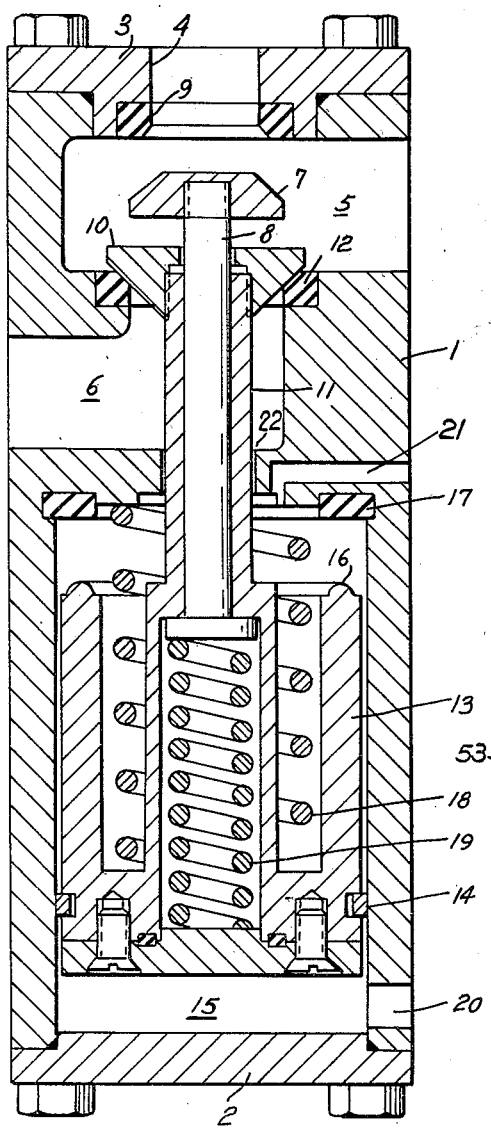
FIGURE 1 shows a first embodiment of the invention for a two-way type valve.

Referring first to FIGURE 1, the novel valve is formed of a main cylinder body 1 having a lower cap 2 sealed thereto, and an upper cap 3 sealed thereto. When the valve of FIGURE 1 is to be used as an operating valve for an air blast circuit breaker, compressed air will normally be fed through orifice 4 to chamber 5 which is, in turn, for example connected to the operating mechanism of the cooperating contacts in an air blast circuit breaker. When the cooperating contacts of the air blast circuit breaker are to be opened, it is desired that compressed air be permitted to pass through the orifice 4 to the contact mechanism. When the contacts are to be opened, the chamber 5 is connected to chamber 6 which is, in turn, in communication with the open air, and at the same time, the orifice 4 is to be isolated from chamber 5. Thus, the compressed air within the interrupter mechanism (not shown in the figure) will vent out through space 6 of FIGURE 1. At the same time, orifice 4 is to be closed until such time as the circuit breaker is to be opened.

In order to control the various connections between the orifices of FIGURE 1, a first valve-head 7 carried by rod 8 is movable to a valve closed position with respect to valve seat 9 to close off opening 4. In a similar manner, a second valve-head 10 is provided at the end of hollow rod 11 which slidably receives rod 8 where the head 10 is movable into and out of sealing engagement with valve seat 12 which surrounds the periphery of the internal opening of chamber 6.

Rod 11 is an integral extending member of the re-entrant piston 13 which moves within the lower chamber in body 1. More specifically, piston 13 is provided with piston rings 14 which attempt to form a reasonably good seal between space 15 and areas on top of piston 13, and, in accordance with the invention, the upper end of piston 13 is provided with a protruding annular extension 16 which is movable into engagement with gasket 17.

A first biasing spring 18 is then arranged in the re-entrant portion of piston 13 to normally bias piston 13 downwardly so as to move valve-head 10 to a normally engaged position with valve seat 12 to thereby isolate the compressed air source at orifice 4 and the space 5 from the space 6.

A second biasing spring 19 is contained within piston 13, as illustrated, to bias rod 8 and head 7 to its most extended position, as illustrated in the figure.

In order to operate the valve heads 7 and 10 so that, for a short interval of time the compressed air at orifice 4, the space 5 and the space 6 are all interconnected, and thereafter the compressed air source at orifice 4 is isolated from space 5 while space 5 is connected to space 6, a source of high pressure air is applied at orifice 20 which is connected to space 15. By applying pressure at orifice 20, piston 13 is driven upwardly.

It is to be noted that a channel 21 is provided in the cylinder wall to communicate with the area on top of piston 13 so that a back pressure is not created during the upward motion of piston 13. During this upward motion, valve-head 10 and valve-head 7 will move together so that, for a short interval of time, all of the spaces referred to above will be interconnected. After a predetermined time, valve-head 7 will seat on valve seat 9, although pitson 13 can continue to move upwardly, whereby rod 8 moves downwardly with respect to rod 11 while compressing spring 19. Thus a high pressure seal will be created between valve head 7 and valve seat 9 to securely isolate the compressed air source at orifice 4 with respect to an interrupter mechanism which could be connected to space 5.

By maintaining the pressure in space 15, this seated position of the valve head will be maintained whereby space 5 continues to communicate with space 6 since valve 10 is held open which would, for example, correspond to a circuit breaker open position, air from space 5 exhausting to atmosphere through space 6. This circuit breaker open position may be required for an extended period of time.

To avoid during this time compressed air in space 15 to a large extent from leaking out to open air, the use of membrane-type valves has previously been necessary. In accordance with the present invention, however, and when piston 13 completes its upward travel, it will be seen that the annular raised surface 16 will strongly engage gasket 17, whereby an effective seal is formed between chamber 15 and areas through which the air could leak, such as through channel 21 and the portion where rod 11 passes through the central portions of body 1, shown as annular area 22 in FIGURE 1. Moreover, this novel auxiliary seal between raised section 16 and gasket 17 eliminates the need for expensive piston rings 14, whereby the piston rings 14 can be inexpensive without the necessity for very close tolerances during manufacture which could be upset at different temperatures.

Figure 2:
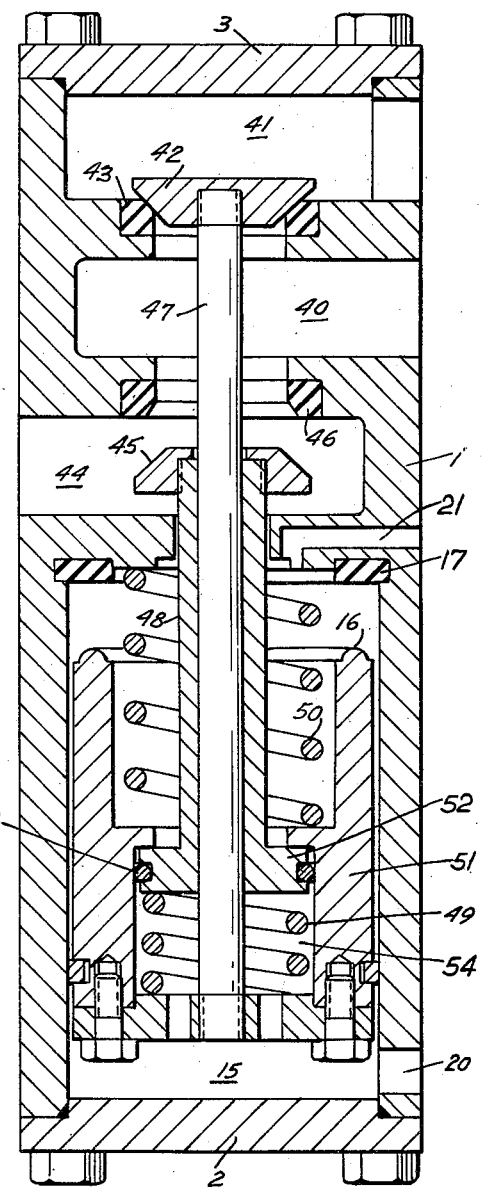
FIGURE 2 shows a second embodiment of the invention for a two-way valve.

A second embodiment of the invention is set forth in FIGURE 2 for a two-way type valve. In FIGURE 2, the components similar to those of FIGURE 1 have been given similar identifying numerals. In FIGURE 2 a source of compressed air may be connected to space 41. Space 40 may, as space 5 in FIGURE 1, be connected to the operating mechanism of the cooperating contacts in an air blast circuit breaker. The valve selectively connects space 40 to this source through valve head 42 and valve seat 43, or to space 44 and open air through valve head 45 and valve seat 46. The valve head 42 in FIGURE 2 is connected to rod 47 which, in turn, is directly secured to the bottom of piston 51, while valve head 45 is connected to hollow rod 48 which slidably receives rod 47, and is connected to auxiliary piston 52. A biasing spring 49 is arranged between pistons 51 and 52. A second biasing spring 50 biases piston 51 and valve head 42 downwardly so that valve head 42 has a normally valve-closed condition. The auxiliary piston 52 is movably arranged in the operating piston 51. The sealing between these two pistons is achieved by a piston ring 53—preferably of rubber or some similar material—with a circular cross sectional surface. As the auxiliary piston 52 has a very short stroke length and moreover does not slide particularly quickly, the piston ring may be made to give a high sealing pressure against the walls along which it slides. A space 54 below the auxiliary piston communicates with the space 15.

The operation of the two-way valve of FIGURE 2 is similar to that described in FIGURE 1 wherein, in order to operate the two-way valve so that space 40 is disconnected from space 44 and is connected to space 41, compressed air is applied to space 15. This causes piston 51 to move upwardly so that annular ring 16 seals with respect to gasket 17 to thereby preserve the compressed air in space 15, even though this space remains under compression for an extended period of time. During this upward motion, it will be noted that valve head 45 and valve head 42 initially move upwardly together until valve head 45 engages valve seat 46. The piston 51 continues to move upwardly to its sealed position with respect to gasket 17 with spring 49 being contracted to increase the biasing pressure between valve head 45 and its seat 46. The spring 49 does not need to be so strong as the spring 19 in FIGURE 1. This is because in FIGURE 2 the compressed air in the space 54 below the piston 52 in the upper position of piston 51 increases the sealing pressure of the valve head 45 against valve seat 46.

Although I have described preferred embodiments of my novel invention, many variations and modifications will now be obvious to those skilled in the art, and I prefer therefore to be limited not by the specific disclosure herein but only by the appended claims.

I claim:
1. A pneumatically operated valve comprising a first valve seat, a first valve head movable between sealed and unsealed positions with respect to said first valve seat, a cylinder, an operating piston movable within said cylinder, said first valve head being slidably mounted with respect to said piston, means operatingly engaging said valve head and piston resiliently urging said first valve head towards a sealed position, a first space within said cylinder limited by one surface of said piston and connected to a high pressure air inlet; a second space within said cylinder limited by the opposite surface of said piston and connected to open air; said second space including a sealing means; said sealing means being engaged by at least a portion of the surface of said piston when said piston completes its travel in one direction within said cylinder to form a seal between said first and second spaces, said first valve head engaging said valve seat in a sealed position when said piston engages said sealing means, a second valve head and a cooperating second valve seat therefor; said second valve head being carried by said piston and being moved out of engagement with said second valve seat when said piston moves said first valve head to a sealed position.

2. A pneumatically operated valve comprising a valve head movable between sealed and unsealed positions with respect to a valve seat, a cylinder, and an operating piston movable within said cylinder; an auxiliary piston operatively connecting said valve head to said operating piston; a first space within said cylinder limited by one surface of said operating piston and connected to a high pressure air inlet; a second space within said cylinder limited by the opposite surface of said operating piston and connected to open air; said second space including a sealing means; said sealing means being engaged by at least a portion of the surface of said operating piston when said piston completes its travel in one direction within said cylinder to form a seal between said first and second spaces; said valve head engaging said valve seat in sealed position when said operating piston engages said sealing means; a second valve head and a cooperating second valve seat therefor; said second valve head being carried by said operating piston and being moved out of engagement with said second valve seat when said operating piston moves said first valve head to sealed position.

References Cited in the file of this patent

UNITED STATES PATENTS

| | | |
|---|---|---|
| 1,010,890 | Fulton | Dec. 5, 1911 |
| 1,592,951 | McLaughlin | July 20, 1926 |
| 1,623,431 | McVoy | Apr. 5, 1927 |
| 1,775,999 | Haselof | Sept. 16, 1930 |